(12) United States Patent
Uhm et al.

(10) Patent No.: US 9,685,249 B2
(45) Date of Patent: Jun. 20, 2017

(54) BETA VOLTAIC BATTERY AND METHOD OF PREPARING THE SAME

(71) Applicants: KOREA ATOMIC ENERGY RESEARCH INSTITUTE, Daejeon (KR); Electronics and Telecommunications Research Institute, Daejeon (KR)

(72) Inventors: Young Rang Uhm, Daejeon (KR); Kwang Jae Son, Sejong (KR); Sung-Weon Kang, Daejeon (KR); Kyung-Hwan Park, Daejeon (KR); Byoung-Gun Choi, Daejeon (KR)

(73) Assignees: KOREA ATOMIC ENERGY RESEARCH INSTITUTE, Daejeon (KR); Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/976,477

(22) Filed: Dec. 21, 2015

(65) Prior Publication Data

US 2016/0180980 A1  Jun. 23, 2016

(30) Foreign Application Priority Data

Dec. 22, 2014 (KR) ......................... 10-2014-0185994

(51) Int. Cl.
*G21H 1/02* (2006.01)
*G21H 1/06* (2006.01)

(52) U.S. Cl.
CPC ................. *G21H 1/02* (2013.01); *G21H 1/06* (2013.01)

(58) Field of Classification Search
CPC ........................................................ G21H 1/06
See application file for complete search history.

(56) References Cited

U.S. PATENT DOCUMENTS

| 8,492,861 B1* | 7/2013 | Moosman | ............... | G21H 1/02 257/428 |
| 2014/0319963 A1* | 10/2014 | Choi | ..................... | H01L 31/115 310/303 |
| 2015/0075593 A1* | 3/2015 | Choi | ........................ | G21H 1/06 136/252 |

FOREIGN PATENT DOCUMENTS

| KR | 1020130119866 A | 11/2013 |
| KR | 1020140098897 A | 8/2014 |
| KR | 1020140129404 A | 11/2014 |

* cited by examiner

*Primary Examiner* — Yu-Hsi D Sun
(74) *Attorney, Agent, or Firm* — Fredrikson & Byron, P.A.

(57) ABSTRACT

Provided is a beta voltaic battery including a first semiconductor layer, a second semiconductor layer, and a beta-ray generator which is disposed between the first semiconductor layer and the second semiconductor layer and includes a metal substrate having both sides coated with a radioisotope layer. The beta voltaic battery according to the present invention has no sealing layer, but may efficiently shield beta rays through a sandwich structure. Since the sealing layer is absent, the absorption of beta rays by the semiconductor may be improved, and excellent energy conversion efficiency may be obtained because output is improved due to the two semiconductor layers and the radioisotope ray source coated on the both sides.

9 Claims, 7 Drawing Sheets

BETA VOLTAIC BATTERY AND METHOD OF PREPARING THE SAME

TECHNICAL FIELD

The present disclosure relates to a beta voltaic battery and a method of preparing the same.

BACKGROUND ART

In general, a radioisotope is an element which emits radiation having a specific energy and then decays into a stable isotope. Herein, decay modes include so-called EC decay, in which an atomic nucleus captures K-orbital electrons, in addition to α, β−, and β+ decay. Most of radioisotopes emit extra energy as alpha rays, beta rays, or gamma rays to become stable isotopes. The amount of the radioisotope is represented by radioactive intensity, that is, the number of decays per unit time. The time required for the amount of an radioactive element to be reduced to half its initial value by radioactive decay is denoted as a half-life period, wherein since the period is constant depending on a radioisotope, the radioisotope may emit radiation from a few years to a few hundred years depending on the half-life period.

A beta voltaic battery is a battery which is realized by using a P—N semiconductor that absorbs beta rays emitted from a radioisotope such as nickel (Ni-63) and promethium-147 (Pm-147). The beta voltaic battery, as a conventional isotope battery using beta rays, may generate a current by disposing a Ni-63 foil or sealed ray source, as a beta-ray emitter, on a semiconductor having a silicon P—N junction structure to absorb beta rays. As described above, the semiconductor P—N junction process and the fabrication of the beta-ray source are separately performed, wherein, since beta rays are emitted to the outside in this case, a separate shielding package must be used in the outside of the isotope battery in order to shield the beta rays. In this case, absorption rate and dose of the beta rays absorbed at the P—N junction and energy conversion efficiency of the semiconductor structure directly affect output efficiency.

When techniques related to the above-described beta voltaic battery are examined, Korean Patent Application Laid-open Publication No. 10-2014-0129404 discloses a radioisotope battery and a method of manufacturing the same. Specifically, in the above prior art document, provided are a radioisotope battery, in which the manufacture of the radioisotope battery as well as the shielding of radiation emitted by radioisotope Ni-63 from the outside are achieved, and a method of manufacturing the same. However, in a case in which coating is performed on a metal seed layer as described above, the shielding may occur in the seed layer. Accordingly, output may be reduced due to the low absorption of beta-rays.

As described above, the radioisotope, as an energy source of the battery, is mainly used in the form of a sealed ray source or in the form in which it is electroplated on the surface of the metal seed layer. Particularly, with respect to Ni-63 among the radioisotopes, since its energy is low at 66.945 keV, it may not damage semiconductor chips. However, there are limitations in that self-shielding may occur and a penetration depth of beta rays may be relatively small. Accordingly, since the absorption of beta rays is low, the output may be reduced. With respect to the sealed ray source, sealing is performed by coating the surface of a Ni-63 layer with Ni, wherein, in a case in which the sealing layer is plated on the seed layer, shielding of beta rays may occur in the seed layer, and thus, the absorption of beta rays may almost not occur.

Accordingly, while studying a beta voltaic battery having an excellent energy conversion efficiency, the present inventors developed a beta voltaic battery having a sandwich structure by combining two semiconductor layers with a beta-ray generator, in which both sides of a metal substrate are coated with a radioisotope ray source so as to be directly in contact with the semiconductor layer in the structure of the sealed ray source, and found that, since the beta voltaic battery having a sandwich structure has no sealing layer, the absorption of beta rays by the semiconductor may be improved and the output is improved due to the radioisotope ray source coated on the both sides, thereby leading to the completion of the present invention.

DISCLOSURE OF THE INVENTION

Technical Problem

One object of the present invention is to provide a beta voltaic battery having an excellent energy conversion efficiency. Specifically, the object of the present invention is to provide a beta voltaic battery having an excellent energy conversion efficiency through a sandwich structure, in which two semiconductor layers are combined with a beta-ray generator in which both sides of a metal substrate are coated with a radioisotope.

Technical Solution

In order to achieve the objects, the present invention provides a beta voltaic battery including:
a first semiconductor layer;
a second semiconductor layer; and
a beta-ray generator which is disposed between the first semiconductor layer and the second semiconductor layer and includes a metal substrate having both sides coated with a radioisotope layer.

The present invention also provides a method of preparing a beta voltaic battery including:
preparing a first semiconductor layer and a second semiconductor layer (step 1);
preparing a beta-ray generator by coating both sides of a metal substrate with a radioisotope layer (step 2); and
disposing the beta-ray generator prepared in step 2 between the first semiconductor layer and the second semiconductor layer which are prepared in step 1 (step 3).

The present invention also provides a beta voltaic battery module which includes a beta voltaic battery including:
a first semiconductor layer as a P—N junction;
a second semiconductor layer; and
a beta-ray generator which is disposed between the first semiconductor layer and the second semiconductor layer and includes a metal substrate having both sides coated with a radioisotope layer.

The present invention also provides a method of improving energy conversion efficiency of a beta voltaic battery through a sandwich structure including:
a first semiconductor layer;
a second semiconductor layer; and
a beta-ray generator which is disposed between the first semiconductor layer and the second semiconductor layer and includes a metal substrate having both sides coated with a radioisotope layer.

Advantageous Effects

A beta voltaic battery according to the present invention has no sealing layer, but may efficiently shield beta rays through a sandwich structure. Since the sealing layer is absent, the absorption of beta rays by semiconductors may be improved, and excellent energy conversion efficiency may be obtained because the output is improved due to two semiconductor layers and a radioisotope ray source coated on both sides.

MODE FOR CARRYING OUT THE INVENTION

The present invention provides a beta voltaic battery including:
a first semiconductor layer;
a second semiconductor layer; and
a beta-ray generator which is disposed between the first semiconductor layer and the second semiconductor layer and includes a metal substrate having both sides coated with a radioisotope layer.

Figure 1:
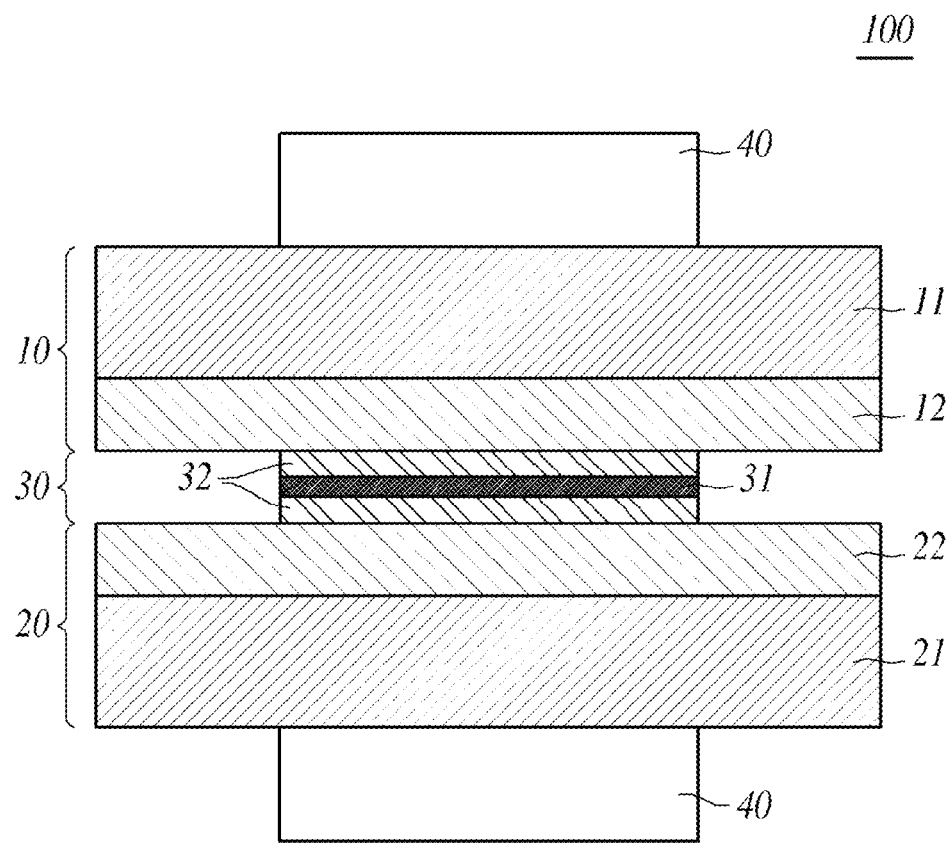
FIG. 1 is a schematic view illustrating a structure of a beta voltaic battery according to the present invention.

In this case, as an example of the beta voltaic battery according to the present invention, a schematic view of a structure of the beta voltaic battery is illustrated in FIG. 1.

Hereinafter, the beta voltaic battery according to the present invention will be described in detail.

A radioisotope, as an energy source of the beta voltaic battery, is mainly used in the form of a sealed ray source or in the form in which it is electroplated on the surface of a metal seed layer. Particularly, with respect to nickel-63 (Ni-63) or promethium-147 (Pm-147) among the radioisotopes, since its energy is low at 66.945 keV, it may not damage semiconductor chips. However, there are limitations in that self-shielding may occur and a penetration depth of beta rays may be relatively small. Accordingly, since the absorption of beta rays is low, the output may be reduced.

Also, with respect to the sealed ray source, sealing is performed by coating the surface of a Ni-63 layer with Ni, wherein, in a case in which the sealing layer is plated on the seed layer, shielding of beta rays may occur in the seed layer, and thus, the absorption of beta rays may almost not occur.

In order to address the above limitations, a beta-ray generator including a metal substrate having both sides coated with a radioisotope layer is disposed between two semiconductor layers in the present invention. Specifically, the beta voltaic battery according to the present invention is formed in a sandwich structure by combining the two semiconductor layers with the beta-ray generator, in which both sides of the metal substrate are coated with a radioisotope ray source so as to be directly in contact with the semiconductor layer in the structure of the sealed ray source. Thus, the beta voltaic battery according to the present invention has no sealing layer, but may efficiently shield beta rays through a sandwich structure. Since the sealing layer is absent, the absorption of beta rays by the semiconductor may be improved, and excellent energy conversion efficiency may be obtained because the output is improved due to the two semiconductor layers and the radioisotope ray source coated on the both sides.

A beta voltaic battery 100 according to the present invention includes a first semiconductor layer 10; a second semiconductor layer 20, as a P—N junction, in which a P-type impurity layer 21 and an N-type impurity layer 22 are joined to each other; and a beta-ray generator 30 which is disposed between the first semiconductor layer and the second semiconductor layer and includes a metal substrate 31 having both sides coated with a radioisotope layer 32.

Specifically, the first semiconductor layer 10 may be a P—N junction in which a P-type impurity layer 11 and an N-type impurity layer 12 are joined to each other.

Also, the second semiconductor layer 20 may be a P—N junction in which the P-type impurity layer 21 and the N-type impurity layer 22 are joined to each other.

Furthermore, the beta-ray generator 30 may be physically in contact with the N-type impurity layer 12 of the first semiconductor layer 10 and the N-type impurity layer 22 of the second semiconductor layer 20. Since beta rays, which are generated from the radioisotope layer 32 included in the beta-ray generator, are in contact with the N-type impurity layers of the first semiconductor layer and second semiconductor layer, the output may be improved, and, although a separate sealing layer is not formed, beta rays may be shielded.

Also, the radioisotope layer 32 may be formed of Ni-63. Emission energy of Ni-63 is a maximum of 64 keV, wherein the Ni-63, as few isotopes which do not damage a semiconductor chip, may have an excellent effect.

Furthermore, the metal substrate may be formed of nickel (Ni), brass, a nickel-titanium (Ni—Ti) alloy, and aluminum (Al).

Also, the radioisotope layer 32 may have a thickness of 0.1 μm to 10 μm. In a case in which the thickness of the radioisotope layer is less than 0.1 μm, the amount of the beta rays generated by the radioisotope ray source may be insufficient, and in a case in which the thickness of the radioisotope layer is greater than 10 μm, the amount of the beta rays may be insufficient due to the self-shielding effect.

The beta voltaic battery 100 may further include an ohmic contact electrode 40 for transmitting electricity generated through the beta voltaic battery 100.

Also, the present invention provides a method of preparing a beta voltaic battery including:
preparing a first semiconductor layer and a second semiconductor layer (step 1);
preparing a beta-ray generator by coating both sides of a metal substrate with a radioisotope layer (step 2); and disposing the beta-ray generator prepared in step 2 between the first semiconductor layer and the second semiconductor layer which are prepared in step 1 (step 3).

Hereinafter, the method of preparing a beta voltaic battery according to the present invention will be described in detail for each step.

First, in the method of preparing a beta voltaic battery according to the present invention, step 1 is a step of preparing a first semiconductor layer and a second semiconductor layer.

Specifically, the first semiconductor layer and second semiconductor layer of step 1 may be P—N junctions in which a P-type impurity layer and an N-type impurity layer are joined to each other.

The preparing of the semiconductor layer in step 1 may be performed by using a silicon wafer, which is fabricated by a typical semiconductor process, i.e., single crystal growth, silicon boule cutting, and wafer surface polishing, but the present invention is not limited thereto.

Also, the p-type impurity layer may include BSG boron and the N-type impurity layer may include $POCl_3$ or a phosphorous dopant, but the present invention is not limited thereto.

Next, in the method of preparing a beta voltaic battery according to the present invention, step 2 is a step of preparing a beta-ray generator by coating both sides of a metal substrate with a radioisotope layer.

Step 2 is a step of preparing the metal substrate having both sides coated with the radioisotope layer, as the beta-ray generator capable of generating beta rays.

A radioisotope, as an energy source of the beta voltaic battery, is mainly used in the form of a sealed ray source or in the form in which it is electroplated on the surface of a metal seed layer. Particularly, with respect to nickel-63 (Ni-63) or promethium-147 (Pm-147) among the radioisotopes, since its energy is low at 66.945 keV, it may not damage semiconductor chips. However, there are limitations in that self-shielding may occur and a penetration depth of beta rays may be relatively small. Accordingly, since the absorption of beta rays is low, the output may be reduced.

Also, with respect to the sealed ray source, sealing is performed by coating the surface of a Ni-63 layer with Ni, wherein, in a case in which the sealing layer is plated on the seed layer, shielding of beta rays may occur in the seed layer, and thus, the absorption of beta rays may almost not occur.

In order to address the above limitations, the beta-ray generator including the metal substrate having both sides coated with the radioisotope layer is disposed between the two semiconductor layers in the present invention. Specifically, the beta voltaic battery according to the present invention is formed in a sandwich structure by combining the two semiconductor layers with the beta-ray generator, in which both sides of the metal substrate are coated with a radioisotope ray source so as to be directly in contact with the semiconductor layer in the structure of the sealed ray source. Thus, the beta voltaic battery according to the present invention has no sealing layer, but may efficiently shield beta rays through a sandwich structure. Since the sealing layer is absent, the absorption of beta rays by the semiconductor may be improved, and excellent energy conversion efficiency may be obtained because the output is improved due to the two semiconductor layers and the radioisotope ray source coated on the both sides.

Specifically, the radioisotope layer of step 2 may be formed of Ni-63. In a case in which the Ni-63 is used in a beta voltaic battery, since the damage of the semiconductor chip is low and there is no shielding issue, the Ni-63 may have an excellent effect.

Also, the metal substrate of step 2 may be formed of Ni, brass, a Ni—Ti alloy, and Al.

Furthermore, as a specific example, the preparing of the beta-ray generator of step 2 may be performed by electroplating including:

preparing a plating bath by mixing a radioisotope with a solvent (step a); and disposing two electrodes and a metal substrate between the two electrodes in the plating bath prepared in step a and applying a voltage to deposit the radioisotope on both sides of the metal substrate (step b).

First, step a is a step of preparing a plating bath by mixing a radioisotope with a solvent.

In step a, a plating bath including a radioisotope is prepared for coating the both sides with a radioisotope layer by electroplating.

Specifically, a concentration of the radioisotope of step a may be in a range of 0.1 M to 0.5 M and may be in a range of 0.2 M to 0.4 M.

Also, the solvent of step a may be an acidic solvent, and a pH of the plating bath of step a may be adjusted to 1.0 to 5.0.

Next, step b is a step of disposing two electrodes and a metal substrate between the two electrodes in the plating bath prepared in step a and applying a voltage to deposit the radioisotope on both sides of the metal substrate.

Specifically, the deposition of the radioisotope of step b may be performed by electrophoresis in which the metal substrate, as a substrate to be deposited, is installed as a (−) electrode, the two electrodes, such as platinum (Pt), are installed as a (+) electrode, and a voltage is applied thereto. The surface of the radioisotope has a (+) charge, wherein the deposition from the (+) charge of the surface of the radioisotope to the surface of the metal substrate, to which a (−) voltage is applied by a power supply, may be possible.

The deposition of step b may be performed by applying a current of 1 mA to 100 mA. In a case in which the current less than 1 mA is applied in step b, the energy efficiency may be high because the deposition is performed at a low voltage, but the deposition itself may not be performed because power for deposition is excessively low. In a case in which the current greater than 100 mA is applied, an excessively thick and non-uniform radioisotope layer may be deposited in a short period of time or there is a risk of accident due to high voltage.

When the electroplating is performed to deposit the radioisotope in step b, the electroplating may be performed for 1 minute to 60 minutes, and, for example, may be performed for 5 minutes to 20 minutes. In a case in which the electroplating is performed for less than 1 minute in step b, the metal substrate may not be sufficiently deposited with the radioisotope, and, in a case in which the electroplating is performed for greater than 60 minutes, since the metal substrate may be sufficiently deposited with the radioisotope in the plating bath, it may be uneconomical.

Next, in the method of preparing a beta voltaic battery according to the present invention, step 3 is a step of disposing the beta-ray generator prepared in step 2 between the first semiconductor layer and the second semiconductor layer which are prepared in step 1.

Specifically, the beta-ray generator of step 3 may be physically in contact with the N-type impurity layer of the first semiconductor layer and the N-type impurity layer of the second semiconductor layer. Since beta rays, which are generated from the radioisotope layer included in the beta-ray generator, are in contact with the N-type impurity layers of the first semiconductor layer and second semiconductor layer, the output may be improved, and, although a separate sealing layer is not formed, beta rays may be shielded.

Furthermore, the present invention provides a beta voltaic battery module which includes a beta voltaic battery including:

a first semiconductor layer;
a second semiconductor layer; and
a beta-ray generator which is disposed between the first semiconductor layer and the second semiconductor layer and includes a metal substrate having both sides coated with a radioisotope layer.

A radioisotope, as an energy source of the beta voltaic battery, is mainly used in the form of a sealed ray source or in the form in which it is electroplated on the surface of a metal seed layer. Particularly, with respect to nickel-63 (Ni-63) or promethium-147 (Pm-147) among the radioisotopes, since its energy is low at 66.945 keV, it may not damage semiconductor chips. However, there are limitations in that self-shielding may occur and a penetration depth of beta rays may be relatively small. Accordingly, since the absorption of beta rays is low, the output may be reduced.

Also, with respect to the sealed ray source, sealing is performed by coating the surface of a Ni-63 layer with Ni, wherein, in a case in which the sealing layer is plated on the seed layer, shielding of beta rays may occur in the seed layer, and thus, the absorption of beta rays may almost not occur.

In order to address the above limitations, a beta-ray generator including a metal substrate having both sides coated with a radioisotope layer is disposed between two semiconductor layers in the present invention. Specifically, the beta voltaic battery according to the present invention is formed in a sandwich structure by combining the two semiconductor layers with the beta-ray generator, in which both sides of the metal substrate are coated with a radioisotope ray source so as to be directly in contact with the semiconductor layer in the structure of the sealed ray source. Thus, the beta voltaic battery according to the present invention has no sealing layer, but may efficiently shield beta rays through a sandwich structure. Since the sealing layer is absent, the absorption of beta rays by the semiconductor may be improved, and excellent energy conversion efficiency may be obtained because the output is improved due to the two semiconductor layers and the radioisotope ray source coated on the both sides.

The beta voltaic battery module of the present invention, as a collection of the beta voltaic batteries, may also have an excellent energy conversion efficiency.

Furthermore, the present invention provides a method of improving energy conversion efficiency of a beta voltaic battery through a sandwich structure including:

a first semiconductor layer;
a second semiconductor layer; and
a beta-ray generator which is disposed between the first semiconductor layer and the second semiconductor layer and includes a metal substrate having both sides coated with a radioisotope layer.

The method of improving energy conversion efficiency of a beta voltaic battery according to the present invention forms a sandwich structure by combining the two semiconductor layers with the beta-ray generator in which both sides of the metal substrate are coated with a radioisotope ray source so as to be directly in contact with the semiconductor layer in the structure of the sealed ray source.

Although there is no sealing layer, beta rays may be efficiently shielded through the sandwich structure. Since the sealing layer is absent, the absorption of beta rays by the semiconductor may be improved, and the method may improve the energy conversion efficiency because the output is improved due to the two semiconductor layers and the radioisotope ray source coated on the both sides.

Hereinafter, the present invention will be described in more detail according to the following examples and experimental examples.

However, the following examples and experimental examples are provided for illustrative purposes only, and the scope of the present invention should not be limited thereto in any manner.

<Example 1> Preparation 1 of Beta Voltaic Battery

Step 1: a first semiconductor layer, as a P—N junction, in which BSG boron, as a P-type impurity layer, and $POCl_3$, as an N-type impurity layer, were joined to each other, and a second semiconductor layer same as the first semiconductor layer were prepared.

Step 2: a plating bath was prepared in which 0.2 M nickel chloride hexahydrate ($NiCl_2 \cdot 6H_2O$), 0.4 M boric acid ($H_3PO_4$), 0.7 M sodium chloride (NaCl), and 2 g/L of saccharin were mixed.

Pt mesh electrodes, as positive electrodes, were disposed at an interval of 10 cm in the prepared plating bath, and brass was then disposed as a negative electrode between the positive electrodes. Then, electroplating was performed to prepare a beta-ray generator in which both sides of the brass were coated with a Ni-63 ray source.

In this case, the electroplating was performed at a current density of 15 $mA/cm^2$ for 2,342 seconds, wherein the plating bath had a pH of 4, the temperature was 40° C., and stirring was performed at a rotational speed of 300 RPM.

Step 3: the beta-ray generator prepared in step 2 was disposed between the first semiconductor layer and the second semiconductor layer which were prepared in step 1 and combined therewith. Then, electrodes were formed on surfaces of the P-type impurity layers of the first semiconductor layer and the second semiconductor layer to prepare a beta voltaic battery.

<Example 2> Preparation 2 of Beta Voltaic Battery

A beta voltaic battery was prepared in the same manner as in Example 1 except that the electroplating in step 2 of Example 1 was performed at a current density of 20 $mA/cm^2$ for 1,757 seconds.

Comparative Example 1

Step 1: a semiconductor layer, as a P—N junction, in which BSG boron, as a P-type impurity layer, and $POCl_3$, as an N-type impurity layer, were joined to each other, was prepared.

Step 2: a surface of the semiconductor layer prepared in step 1 was deposited with a Ti—Ni seed, and Ni-63 was then plated.

Thereafter, an electrode was formed on a surface of the P-type impurity layer of the semiconductor layer to prepare a beta voltaic battery.

<Experimental Example 1> Scanning Electron Microscope and Energy Dispersive X-ray Analysis In order to identify whether both sides of the beta-ray generator of the beta voltaic battery according to the present invention were coated with the radioisotope layer, the beta-ray generators prepared in step 2 of Examples 1 and 2 were analyzed by a scanning electron microscope (SEM) and energy dispersive X-ray spectroscopy (EDX), and the results thereof are presented in FIGS. 2 to 7.

Figure 2:
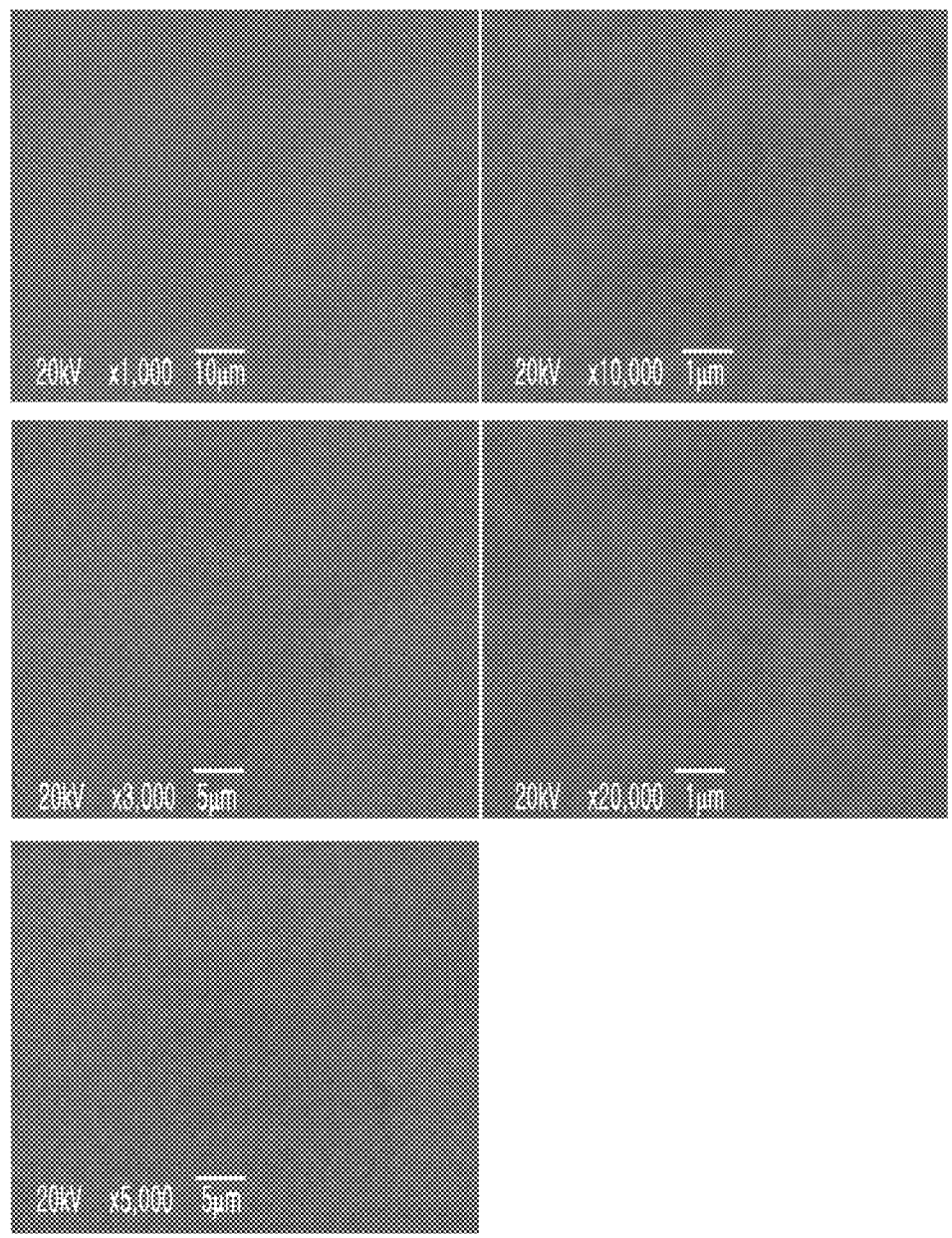
FIG. 2 is scanning electron microscope images of a beta-ray generator prepared in step 2 of Example 1 according to the present invention.
Figure 3:
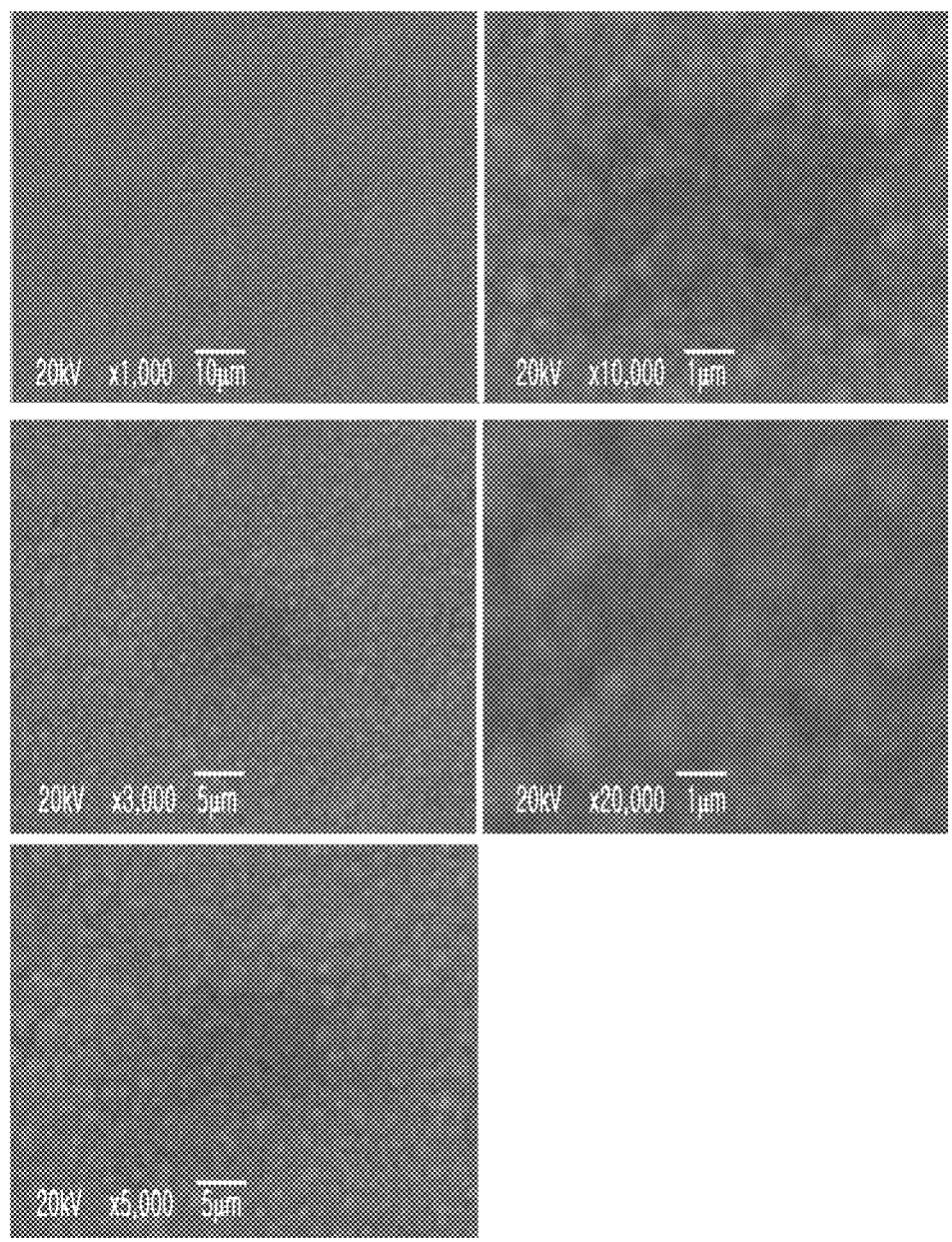
FIG. 3 is scanning electron microscope images of a beta-ray generator prepared in step 2 of Example 2 according to the present invention.

As illustrated in FIGS. 2 and 3, when surface morphologies of the beta-ray generators prepared in step 2 of Examples 1 and 2 were examined, it may be confirmed that Ni-63 was plated.

Figure 4:
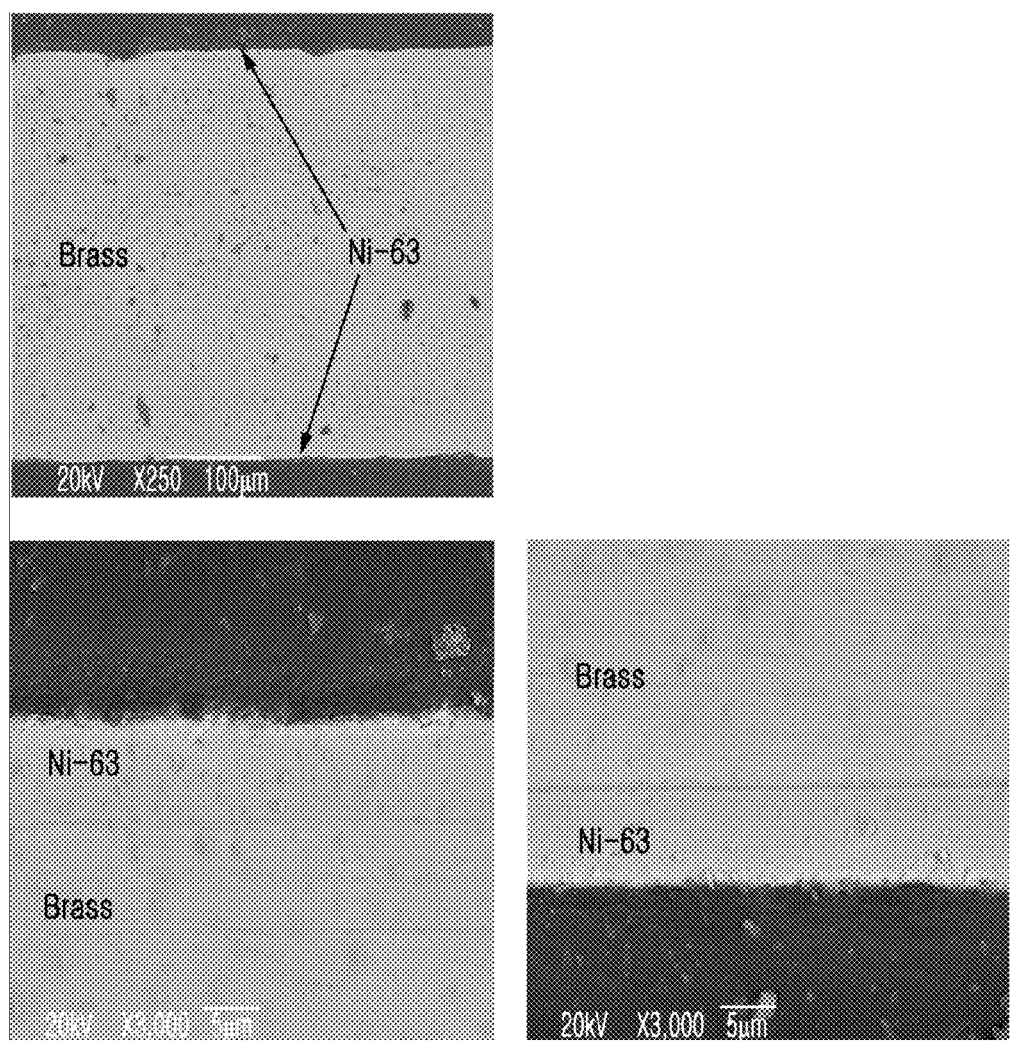
FIG. 4 is scanning electron microscope images of a side of the beta-ray generator prepared in step 2 of Example 1 according to the present invention.
Figure 5:
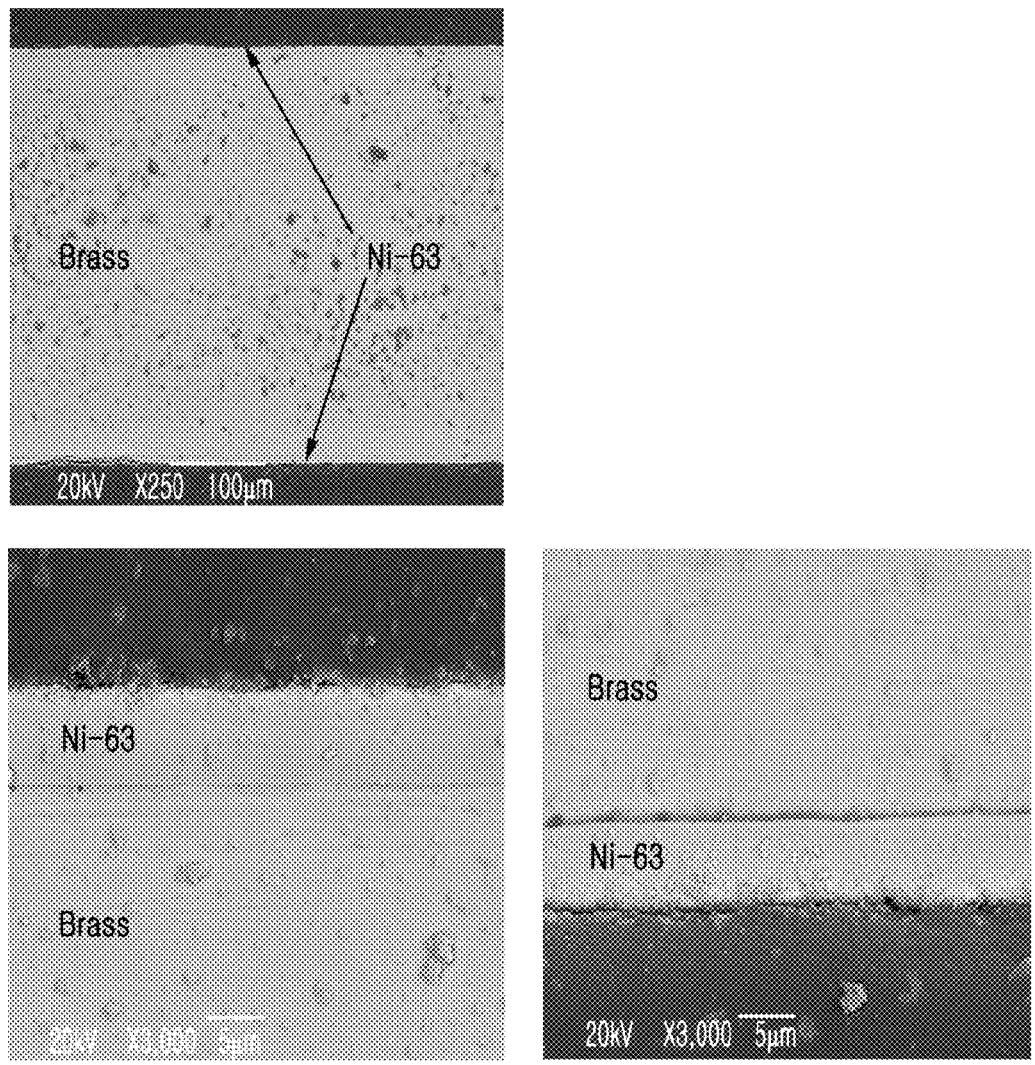
FIG. 5 is scanning electron microscope images of a side of the beta-ray generator prepared in step 2 of Example 2 according to the present invention.

Also, when FIGS. 4 and 5 were examined in which sides of the beta-ray generators prepared in step 2 of Examples 1 and 2 were observed by the SEM, it may be confirmed that the Ni-63 ray source was uniformly coated to a thickness of about 5 μm to about 6 μm.

Figure 6:
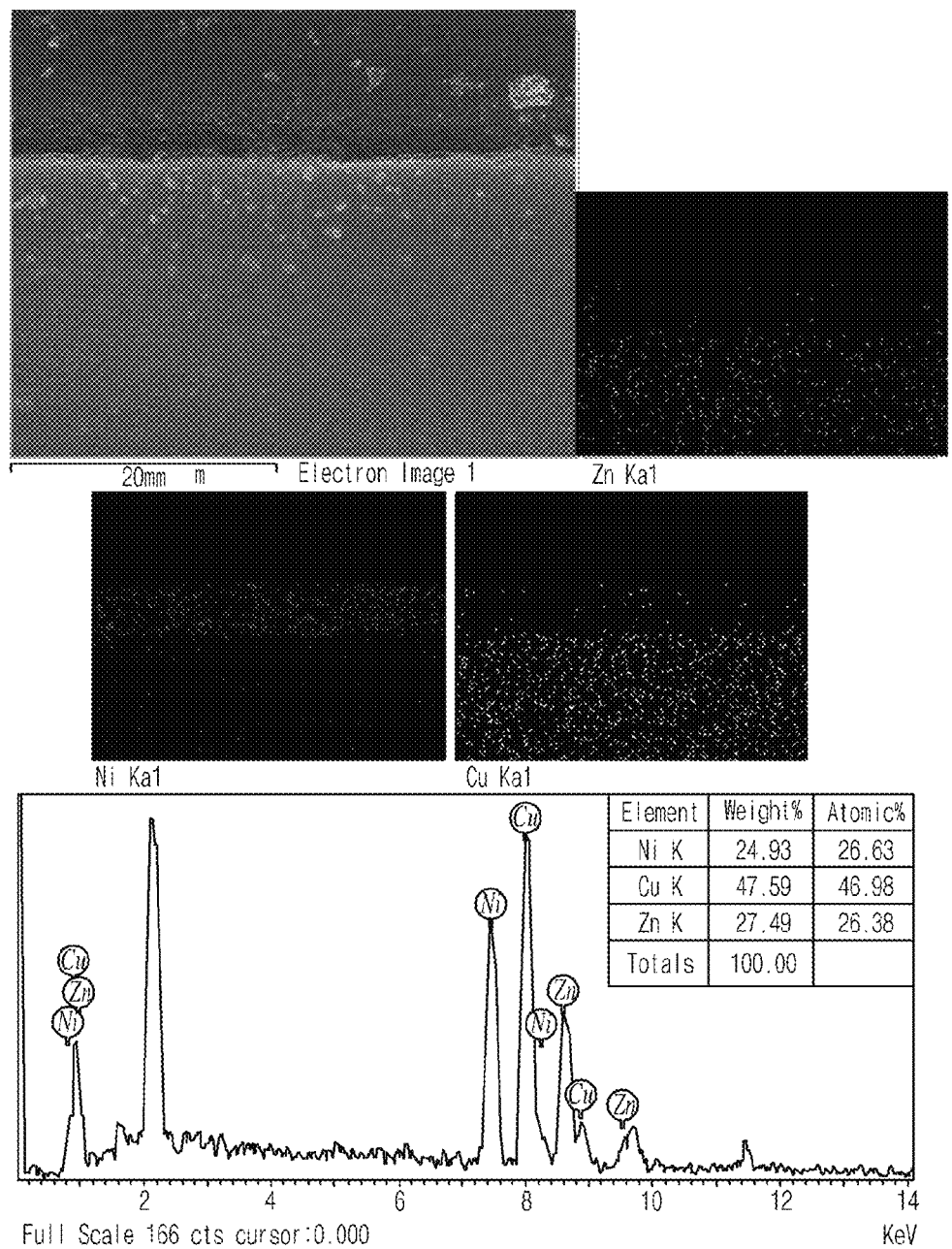
FIG. 6 is images, graph, and table which are obtained by energy dispersive X-ray analysis of the beta-ray generator prepared in step 2 of Example 1 according to the present invention.
Figure 7:
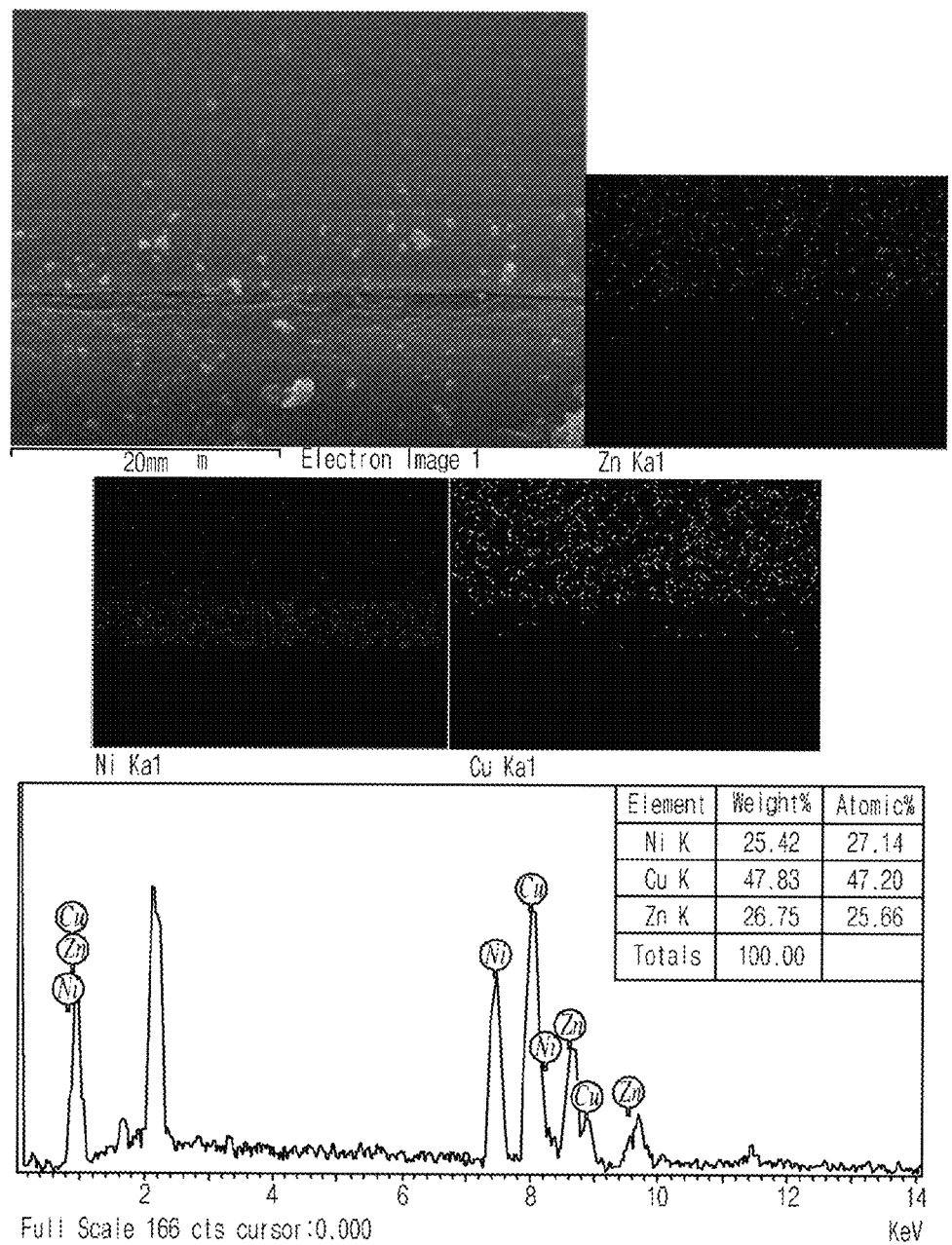
FIG. 7 is images, graph, and table which are obtained by energy dispersive X-ray analysis of the beta-ray generator prepared in step 2 of Example 2 according to the present invention.

As illustrated in FIGS. 6 and 7, it may be confirmed that elemental nickel was distributed.

<Experimental Example 2> Energy Conversion Efficiency Analysis

In order to analyze energy conversion efficiency of the beta voltaic battery according to the present invention, energy conversion efficiencies of the beta voltaic batteries prepared in Examples 1 and 2 and Comparative Example 1 were analyzed, and the results thereof are presented in Table 1.

TABLE 1

|  | $V_{oc}$ (V) | $I_{sc}$ (μA) | $J_{sc}$ (μA/cm$^2$) | $P_{out}$/cm$^2$ (μW/cm$^2$) |
|---|---|---|---|---|
| Example 1 | 0.36 | 4.09 | 343.80 | 123.80 |
| Example 2 | 0.37 | 4.10 | 346.70 | 128.30 |
| Comparative Example 1 | 0.29 | 3.30 | 229.20 | 66.50 |

As illustrate in Table 1, with respect to Comparative Example 1 as a beta voltaic battery having a typical structure, it may be confirmed that output was 66.50 μW/cm$^2$.

In contrast, with respect to Examples 1 and 2 as beta voltaic batteries having a sandwich structure, outputs were respectively 123.80 μW/cm$^2$ and 128.30 μW/cm$^2$, wherein it may be confirmed that performance of Examples 1 and 2 was improved by about 85% in comparison to that of Comparative Example 1.

Thus, it may be estimated that the beta voltaic battery according to the present invention may exhibit an excellent energy conversion efficiency.

The invention claimed is:

1. A method of preparing a beta voltaic battery, the method comprising:
   preparing a first semiconductor layer and a second semiconductor layer (step 1);
   preparing a beta-ray generator by coating both sides of a metal substrate with a radioisotope layer by disposing two electrodes and a metal substrate between the two electrodes in a plating bath comprising a radioisotope and applying a voltage to deposit the radioisotope on both sides of the metal substrate (step 2); and
   disposing the beta-ray generator prepared in step 2 between the first semiconductor layer and the second semiconductor layer which are prepared in step 1 (step 3).

2. The method as set forth in claim 1, wherein the first semiconductor layer and the second semiconductor layer are P—N junctions in which a P-type impurity layer and an N-type impurity layer are joined to each other, and
   the beta-ray generator is physically in contact with the N-type impurity layer of the first semiconductor layer and the N-type impurity layer of the second semiconductor layer.

3. The method as set forth in claim 1, wherein the radioisotope layer is formed of nickel-63 (Ni-63) or promethium-147 (Pm-147).

4. The method as set forth in claim 1, wherein the metal substrate is formed of a metal selected form the group consisting of nickel (Ni), brass, a titanium-nickel (Ti—Ni) alloy, and aluminum (Al).

5. The method as set forth in claim 1, wherein the radioisotope layer has a thickness of 0.1 μm to 10 μm.

6. The method as set forth in claim 1, wherein a concentration of the radioisotope is in a range of 0.1 M to 0.5 M.

7. The method as set forth in claim 1, wherein the solvent is plating bath has an acidic solvent.

8. The method as set forth in claim 1, wherein the plating bath has a pH of 1.0 to 5.0.

9. The method as set forth in claim 1, wherein the deposition is performed by applying a current of 1 mA to 100 mA.

* * * * *